United States Patent [19]

Ujihashi

[11] Patent Number: 4,563,994
[45] Date of Patent: Jan. 14, 1986

[54] FUEL INJECTION CONTROL APPARATUS

[75] Inventor: Michiaki Ujihashi, Mishima, Japan

[73] Assignee: Toyota Jidosha Kabushiki Kaisha, Japan

[21] Appl. No.: 635,102

[22] Filed: Jul. 27, 1984

[30] Foreign Application Priority Data

Aug. 9, 1983 [JP] Japan .................. 58-145263

[51] Int. Cl.⁴ .................................. F02D 5/02
[52] U.S. Cl. ........................ 123/491; 123/480
[58] Field of Search ............... 123/478, 480, 491

[56] References Cited

U.S. PATENT DOCUMENTS

| 3,664,311 | 5/1972 | Endo | 123/491 |
| 4,213,425 | 7/1980 | Read | 123/478 |
| 4,389,995 | 6/1983 | Koide et al. | 123/491 |
| 4,392,467 | 7/1983 | Miyagi et al. | 123/493 |
| 4,438,496 | 3/1984 | Ohie | 123/478 |
| 4,478,190 | 10/1984 | Kawai | 123/478 |

FOREIGN PATENT DOCUMENTS

| 47-14178 | 4/1972 | Japan . |
| 47-41292 | 10/1972 | Japan . |
| 47-35428 | 11/1972 | Japan . |
| 48-51133 | 7/1973 | Japan . |
| 49-8622 | 1/1974 | Japan . |
| 49-40570 | 11/1974 | Japan . |

Primary Examiner—Andrew M. Dolinar
Attorney, Agent, or Firm—Parkhurst & Oliff

[57] ABSTRACT

A fuel injection control apparatus which sets an opening timing of a fuel injection valve according to driving conditions of a vehicle and independently injects an amount of fuel into each of engine cylinders. To obtain the pretty mixed mixture of the fuel and air, the fuel injection control apparatus quicken the opening timing of the fuel injection valve according to the engine coolant temperature or the amount of the throttle opening.

9 Claims, 7 Drawing Figures

FUEL INJECTION CONTROL APPARATUS

BACKGROUND OF THE INVENTION

The presnet invention relates to a fuel injection control apparatus for controlling a fuel injection valve for use of a gasoline engine, and more particularly to a fuel injection control apparatus which sets an opening timing of a fuel injection valve according to a driving condition of an engine and independently injects a specific amount of fuel into each of cylinders in the engine.

In general, there has been proposed such an independent fuel injection control apparatus for injecting fuel independently into each cylinder through a fuel injection valve provided in each intake manifold. The independent fuel injection control apparatus calculates an amount of fuel to be injected so that an air-fuel ratio may be adjusted to an optimum value according to driving conditions such as an engine RPM and an amount of air suctioned into the engine. Next, according to the calculated amount of fuel to be injected, the fuel injection valve is opened for an each cylinder at the timing when each piston within each cylinder is positioned at a predetermined crank angle. Thus, according to the previous independent fuel injection control apparatus, the fuel injection is controlled according to the driving conditions of a vehicle. However, the opening timing of the fuel injection valve is fixed regardless of the driving conditions.

In general, the time period from when an intake valve opens until when the injected fuel is completely suctioned into an engine combustion chamber is very short. This time period varies according to the driving conditions. Hence, if the intake valve opens for only a short time, the entire amount of the injected fuel is not completely suctioned into the cylinder according to the driving conditions of the engine. Further, when the suction speed of the mixture of an air and a fuel is low, the air cannot be satisfactorily mixed with the injected fuel. Particularly, when an engine speed is low, the suction speed of the mixture is low and therefore the mixing between the air and fuel is not thorough. The opening timing of the fuel injection valve is fixed, according to the prior fuel injection control apparatus, which impairs the stability of fuel combustion and the fuel consumption rate. This adversely affects the exhaust gas emission and the engine response during a transient time of the engine. Moreover, it is difficult to obtain the optimum opening timing of the fuel injection valve.

SUMMARY OF THE INVENTION

The present invention was made in view of the foregoing background and to overcome the foregoing drawbacks. It is accordingly an object of this invention to provide a fuel injection control apparatus which calculates an amount of a fuel to be injected according to a driving condition of an engine and calculates an opening timing of a fuel injection valve to obtain an improved fuel injection.

To attain the above objects, a fuel injection control apparatus according to the present invention has a sensor for detecting a parameter which indicates a driving condition of the engine such as an engine coolant temperature and a throttle opening, and an electronic control unit. A fuel injection valve is independently mounted on each cylinder in the engine for use of a vehicle. The electronic control unit includes a first calculation means which calculates an amount of fuel to be injected into each cylinder, and a second calculation means which determines the opening timing of each fuel injection valve. The first calculation means calculates an amount of the fuel to be injected according to the amount of the parameter detected by the sensor. The second calculation means determines the opening timing of each fuel injection valve according to the amount of the parameter detected by the sensor. Thus, according to the present invention, the opening timing of each of the fuel injection valves is varied to an advanced crank angle by the amount of the parameter. This results in an effectively mixed mixture of fuel and air which is suctioned into a combustion chamber within each cylinder.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENT

The present invention is described in detail with reference to the accompanying drawings which illustrate different embodiments of the present invention.

Figure 1:
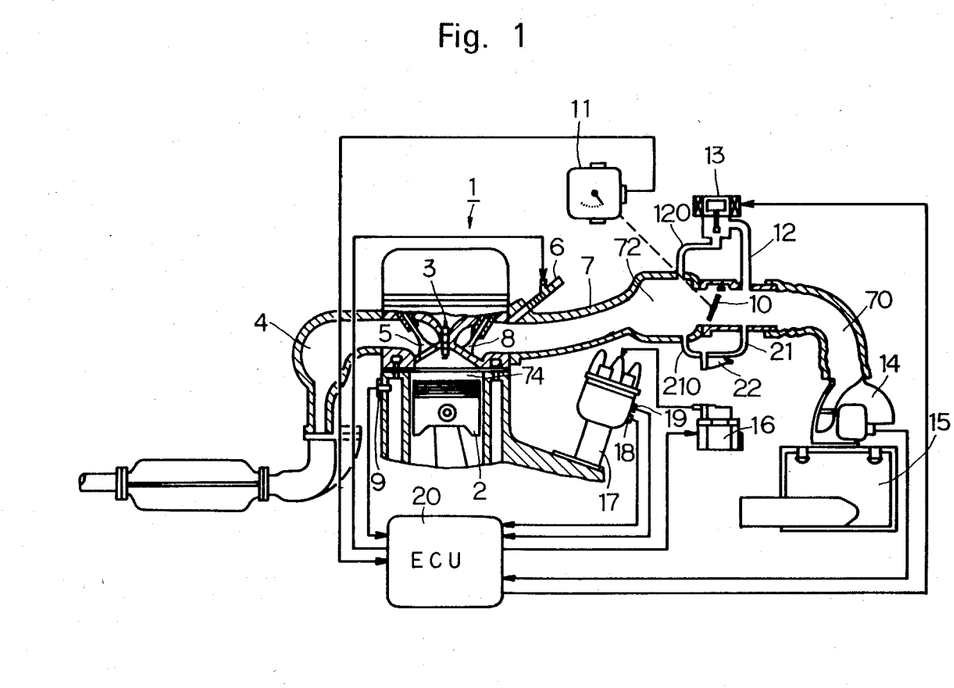
FIG. 1 is a partially schematic view of an internal combustion engine installed with a fuel injection control apparatus according to the present invention.

FIG. 1 illustrates a partially schematic view of an internal combustion engine installed with a fuel injection control apparatus according to the present invention. An air flow meter 14 is provided in an intake passage 70 defined within an intake manifold 7 and is designed to calculate the amount of air introduced into an air-cleaner 15. The air flow meter 14, containing a potentiometer therein, generates an analogous output signal which is in proportion to the amount of the introduced air. A throttle position sensor 11 is provided to detect the opening of a throttle valve 10, and generates a signal which is in proportion to the opening of the throttle valve 10. An engine coolant temperature sensor 9 is mounted on a cylinder block of an engine 1 and detects the temperature of the engine coolant which is filled in an engine coolant jacket. The engine coolant temperature sensor 9 generates an analogous output signal which is proportional to the engine coolant temperature. An idling engine speed control valve 13 is designed to control the amount of the air which bypasses the throttle valve 10. The control valve 13 communicates with the intake passage 70 through a pipe 12 which opens at the upstream intake passage 70 of the throttle valve 10. Further, the control valve 13 communicates with a surge tank 72 through a pipe 120 which opens in the surge tank 72 provided in the downstream intake passage 70 of the throttle valve 10.

A valve 22 is designed to control the amount of the air which bypasses the throttle valve 10. The valve 22 is communicated with the intake passage 70 through a pipe 21 which opens at the upstream intake passage 70 of the throttle valve 10. Further, the valve 22 is communicated with the surge tank 72 through a pipe 210 which opens in the surge tank 72. When the engine coolant temperature is low, the valve 22 is designed to open in order to warm up the engine quickly. The numeral 6 designates a fuel injection valve which is provided in each of the intake manifolds. The mixture of the gasoline injected by the fuel injection valve 6 and the air, is suctioned through an intake valve 8 into a combustion chamber 74 defined between a piston 2 and a cylinder head. The suctioned mixture is compressed by the piston 2 and is ignited by an electric spark produced between the electrodes of a spark plug 3. The burned gases, are discharged through an exhaust valve 5 into an exhaust manifold 4. The spark plug 3 is supplied with a high voltage which is generated by an ignitor 16. The ignitor 16 has an ignition coil therein to generate a high voltage which is necessitated for ignition of the mixture. The high voltage of the ignitor 16 is supplied to each spark plug 3 through a distributor 17 which moves according to the rotation of a crank shaft (not shown in drawings). A rotation angle sensor 18 is provided within the distributor 17, and generates twenty four pulses per 720 degree rotation of the crank shaft. Further, a cylinder distincting sensor 19 is provided within the distributor 17, and generates one pulse per one rotation of a rotor in the distributor 17.

The output signals from the engine coolant temperature sensor 9, the throttle position sensor 11, the air flow meter 14, the rotation angle sensor 18, and the cylinder distincting sensor 19 are inputted into an electronic control unit 20 (hereinafter referred to as ECU). After these output signals are calculated by the ECU 20, the output of the ECU 20 is fed into the fuel injection valve 6.

Figure 2:
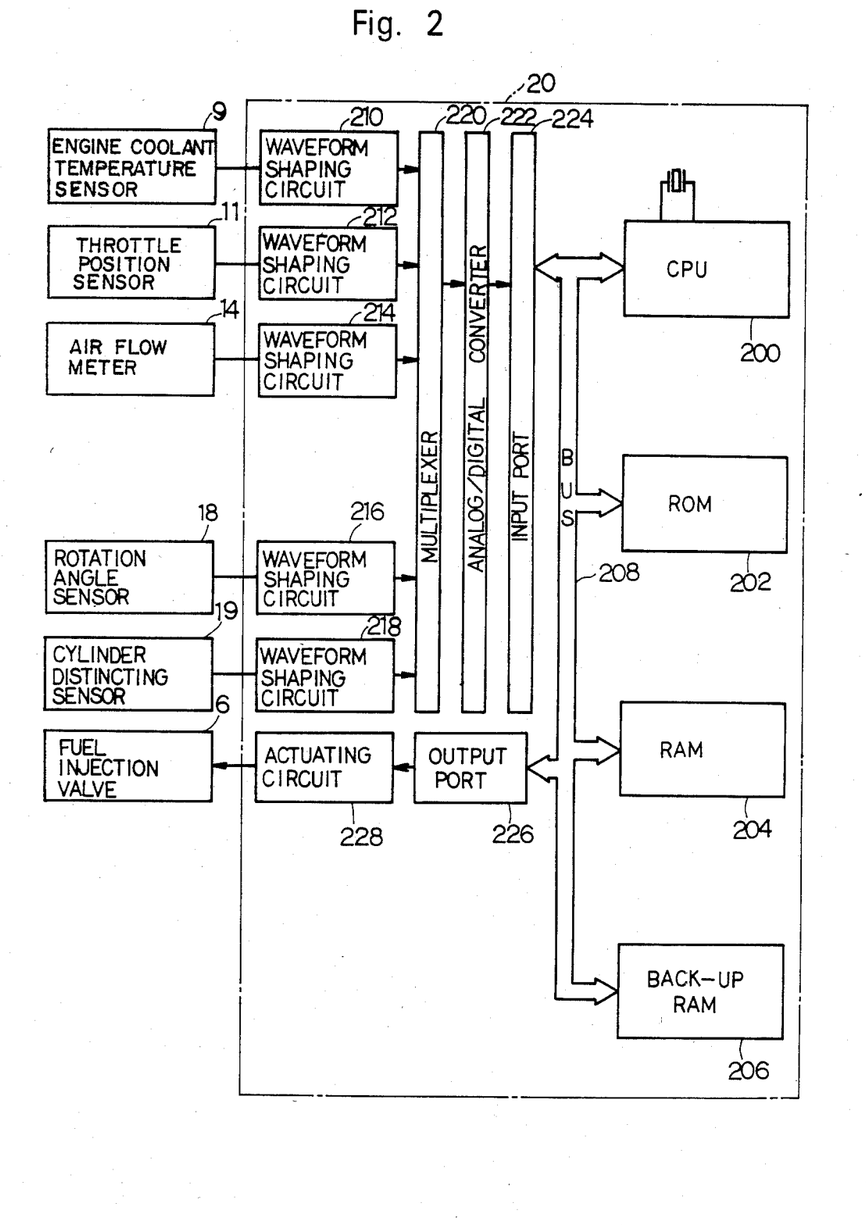
FIG. 2 is a circuit diagram of the electronic control unit illustrated in FIG. 1.

FIG. 2 illustrates a circuit diagram of the ECU 20 illustrated in FIG. 1. The ECU 20 functions as a digital computer and comprises waveform shaping circuits 210–218, a multiplexer 220, an analog/digital converter 222 (hereinafter referred to as A/D), input ports 224, a central processing unit 200 (hereinafter referred to as CPU) which carries out the arithmetic and logic processing means, a read-only memory 202 (hereinafter referred to as ROM) which stores a predetermined control program and arithmetic constants therein, a random-access memory 204 (hereinafter referred to as RAM) which temporarily stores the calculated data of the CPU 200, a back-up RAM 206 which stores the calculated data of the CPU 200 by the use of the power sources of a battery even when an ignition switch turns off, an output port 226, and an actuating circuit 228 for actuating the fuel injection valve 6 according to output signals from the CPU 200.

The analog output signals of the engine coolant temperature sensor 9, the throttle position sensor 11, the air flow meter 14, the rotation angle sensor 18 and the cylinder distincting sensor 19 are fed through the waveform shaving circuits 210, 212, 214, 216 and 218 to the multiplexer 220. The multiplexer 220 is controlled selectively by the CPU 200. The multiplexer 220 feeds the output signals into the A/D 222. The A/D 222 converts the analog output signals into the digital signals. After the analog signals are converted by the A/D 222 to digital signals, the A/D 222 feeds an interruption signal to the CPU 200. In the interruption routine, the latest data of the sensors 9, 11, 14, 18 and 19 are memorized in a predetermined area in the RAM 204, wherein the data can be read in at an equal speed. The CPU 200 calculates the engine coolant temperature, the throttle opening, the amount of the introduced air, and the engine speed according to the output signals of the various sensors. Further, the CPU 200 calculates an injection pulse duration corresponding to the amount of the fuel to be injected. The output signal of the CPU 200 is fed through the output port 226 and the actuating circuit 228 to the fuel injection valve 6. The input ports 224 and the output port 226 are communicated through a common bus 208 with the CPU 200, the ROM 202, the RAM 204 and the back-up RAM 206.

In the output port 226, there are provided along with a register, which receives output data corresponding to a fuel injection pulse duration $\tau$ from the CPU 200, a binary counter which starts the counting operation with respect to clock pulses when fuel injection initiation pulses are fed from the input port 224, and a binary comparator for comparing the contents in the register and binary counter. The binary comparator produces an injection pulse signal of "1" level from the time when the fuel injection initiation pulse is supplied thereto until the time when the contents of the binary counter coincide with those of the register. The injection pulse signal produced by the binary comparator has an injection pulse duration $\tau_i$. The injection pulse signal is fed to the fuel injection valve 6 through the actuating circuit 228. The fuel injection valve 6 injects into the combustion chamber a quantity of fuel corresponding to the injection pulse duration $\tau_i$.

Figure 5:
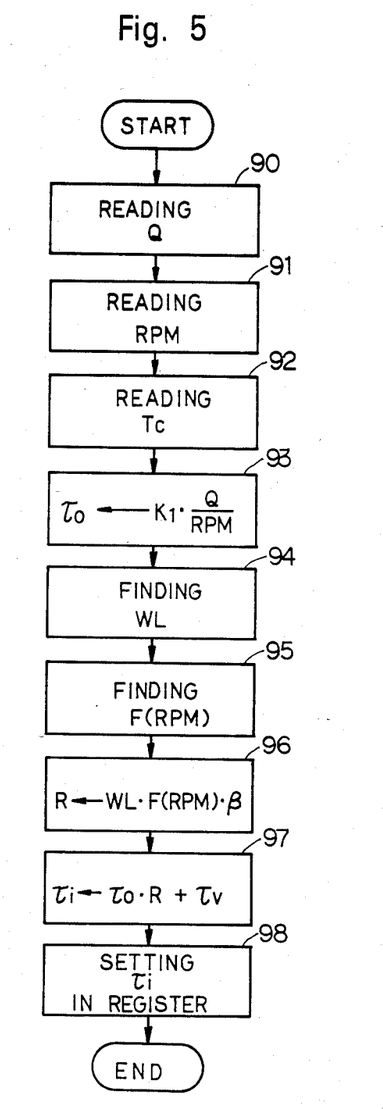
FIG. 5 is a flow chart which illustrates an operation for setting an injection pulse duration $\tau_i$ in a register of an output port, according to the present invention.
Figure 6:
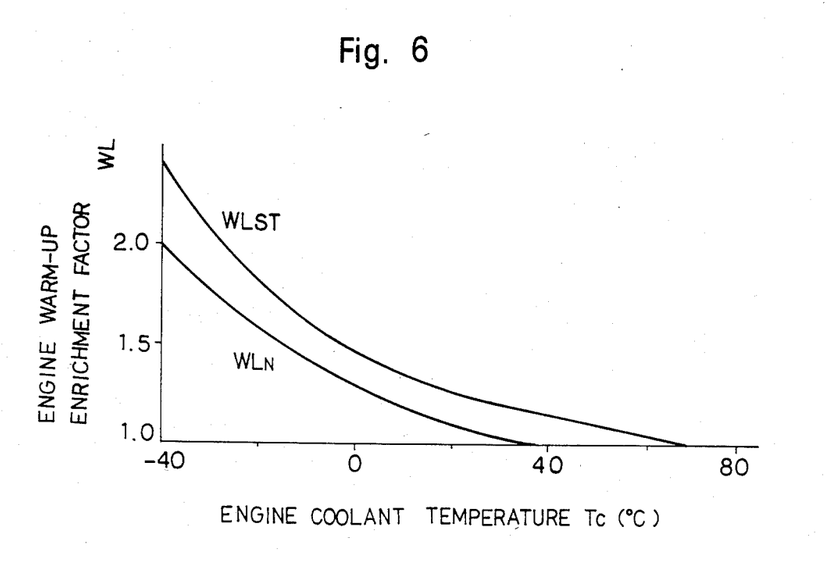
FIG. 6 is a diagram which illustrates the relationship between an engine coolant temperature tc and an engine warm-up enrichment factor WL.

The fuel injection pulse duration $\tau_i$ is determined by the following procedures. FIG. 5 shows a flow chart which illustrates the operation for setting the injection pulse duration $\tau_i$ in the register of the output port 226. In step 90, the CPU 200 commences to read the amount of the introduced air Q from the RAM 204. Further, in steps 91 and 92, the engine speed (RPM) and the engine coolant temperature Tc are read from the RAM 204, respectively. The program proceeds to step 93, wherein the CPU 200 calculates a basic fuel injection pulse duration $\tau_o$ according to the following equation:

$$\tau_o = K_1 \cdot (Q/RPM)$$

where, $K_1$ is a constant. The program proceeds to step 94, wherein the CPU 200 determines a warm enrichment factor WL in accordance with engine coolant temperature Tc. In FIG. 6, there is shown a relationship between the warm-up enrichment factor WL and the engine coolant temperature TC. The ROM 202 beforehand stores the map of the relationships Tc-$WL_{ST}$ and Tc-$WL_N$. Here, $WL_{ST}$ designates an engine starting enrichment factor, and $WL_N$ designates a normal warm-up enrichment factor. In the step 94, the CPU 200 further determines whether or not the engine is starting, from a signal of an engine starter swtich. If the engine is starting, the engine starting enrichment factor $WL_{ST}$ is employed as a warm-up enrichment factor WL. On the other hand, if it is not starting, the normal warm-up enrichment factor $WL_N$ is employed as a warm-up enrichment factor WL. As shown in FIG. 6, both of the factors $WL_{ST}$ and $WL_N$ decrease as the engine coolant temperature Tc increases. The factor $WL_{ST}$ is designed to have a greater amount than that of the factor $WL_N$ so as to obtain the enriched air-fuel mixture during the staring of the engine.

Figure 7:
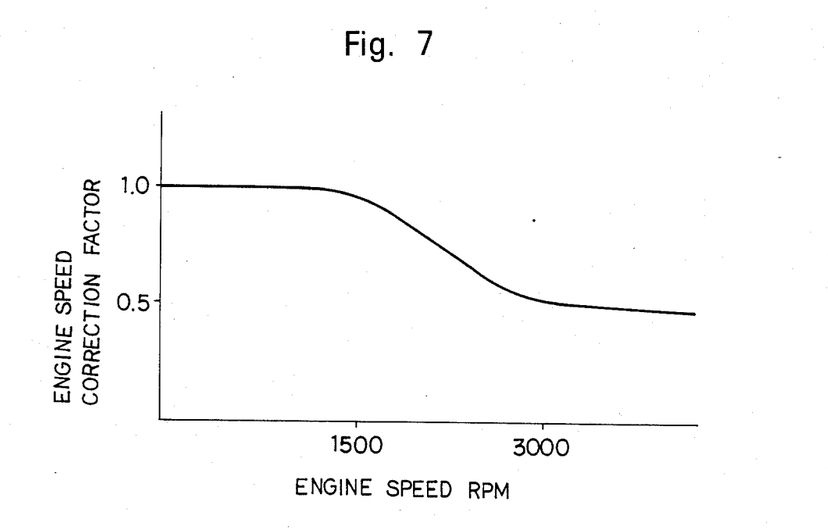
FIG. 7 is a diagram which illustrates the relationship between an engine speed RPM and an engine speed correction factor F(RPM).

The program proceeds to step 95, wherein the CPU 200 finds an engine speed correction factor f(RPM) in accordance with the engine speed RPM. In FIG. 7, there is shown a relationship between the engine speed RPM and the engine speed correction factor f(RPM). The ROM 202 beforehand stores the map of the relationship shown in FIG. 7. As shown in FIG. 7, the engine speed correction factor f(RPM) is low at a high engine speed and is high at a low engine speed. The engine speed correction factor f(FPM) may be defined in other ways. For example, the factor f(RPM) may be defined as an algebraic function of f(RPM)=(B/RPM), where B is a constant. If the function of f(RPM)=(B/RPM) is employed, the amount of the factor f(RPM) decreases as the engine speed RPM increases, and further increases as the engine speed (RPM) decreases.

The program proceeds to step 96, wherein the warm-up enrichment factor WL is corrected by being multiplied by the factor f(RPM). A total enrichment correction factor R is calculated from the following equation:

$$R = WL \cdot F(RPM) \cdot \beta$$

where, $\beta$ is another enrichment factor. The program proceeds to step 97, wherein the CPU 200 calculates a final injection pulse duration $\tau_i$ from the following equation:

$$\tau_i = \tau_0 \cdot R + \tau_v$$

where $\tau_v$ is a value corresponding to the ineffective injection pulse duration of the fuel injection valve 6. The program proceeds to step 98, wherein the data of the pulse duration $\tau_i$ is set in the register in the output port 226.

Figure 3:
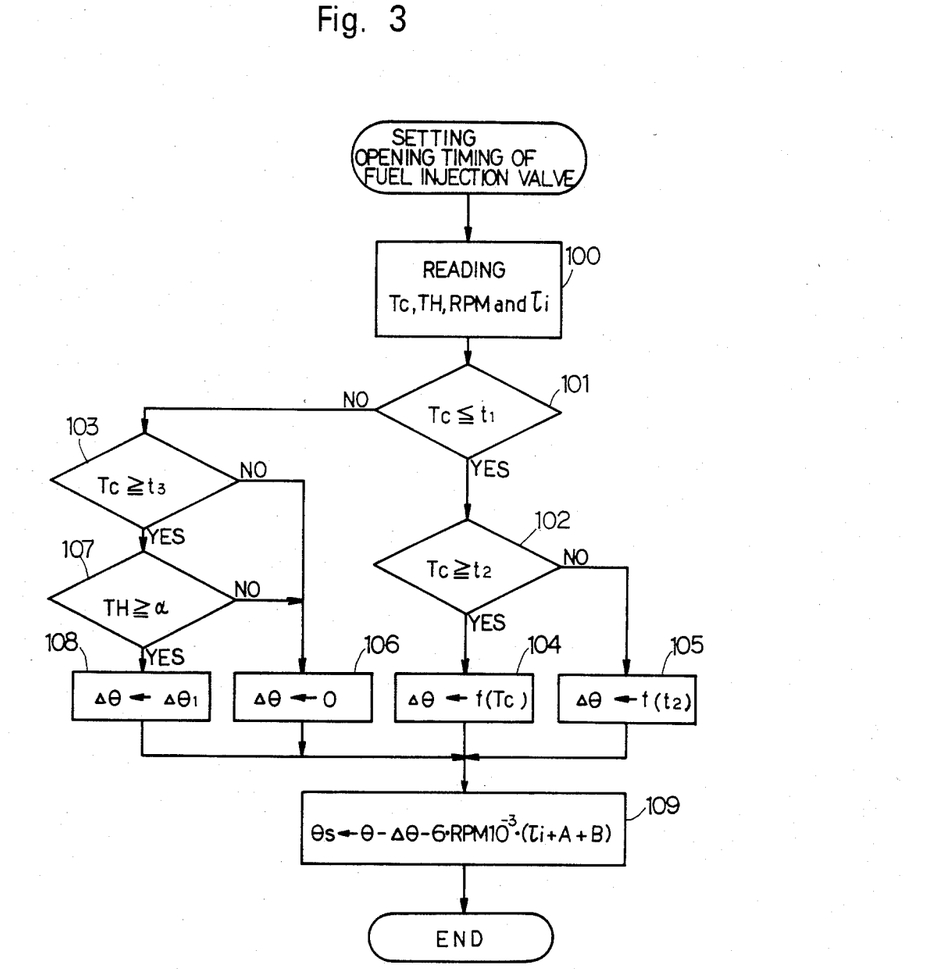
FIG. 3 is a flow chart illustrating the operation of the apparatus according to the present invention.

The opening timing of the fuel injection valve 6 is explained hereunder. FIG. 3 shows a flow chart illustrating the operation of the apparatus according to the present invention. The calculation of the flow chart shown in FIG. 3 is carried out one time per two revolutions of the engine by each cylinder. A step 100 commences to read the engine coolant temperature Tc, the throttle opening TH, the engine speed RPM and the injection pulse duration $\tau_i$. The program proceeds to a step 101, wherein it is determined whether or not the engine coolant temperature Tc read in the step 100 is equal to or lower than a first predetermined temperature $t_1$ (for example, 80° C.). If the engine coolant temperature Tc is equal to or lower than the predetermined temperature $t_1$, the program proceeds to a step 102. In the step 102, it is determined whether or not the engine coolant temperature Tc is equal to or higher than a second predetermined temperature $t_2$ (for example, 40° C.) which is lower than the first predetermined temperature $t_1$. On the other hand, if the engine coolant temperature Tc is higher than the first predetermined temperature $t_1$, the program proceeds to a step 103, wherein it is determined whether or not the engine coolant temperature Tc is equal to or higher than a third predetermined temperature $t_3$ (for example, 100° C.) which is higher than the first predetermined temperature $t_1$. If the engine coolant temperature Tc is equal to or higher than the second predetermined temperature $t_2$, the program proceeds to a step 104. In the step 104, a compensation value $\Delta\theta$ of a crank angle is calculated by the following equation:

$$\Delta\theta = K_2 \cdot Tc \qquad (1)$$

where,
$K_2$ is a compensation modulus,
Tc is an engine coolant temperature.

Next, when the engine coolant temperature Tc is lower than the second predetermined temperature $t_2$, the program proceeds to a step 105, wherein a compensation value $\Delta\theta$ of a crank angle is calculated by the following equation:

$$\Delta\theta = K_3 \cdot t_2 \qquad (1)'$$

where, $K_3$ is a compensation modulus.

When the engine coolant temperature Tc is lower than a third predetermined temperature $t_3$ in the step 103, the program proceeds to a step 106. In the step 106, the compensation value $\Delta\theta$ of a crank angle is set equal to zero. When the engine coolant temperature Tc is equal to or higher than the third predetermined temperature $t_3$, the program proceeds from the step 103 to a step 107, wherein it is determined whether or not the throttle opening TH is greater than a predetermined opening $\alpha$. If the throttle opening TH is less than the predetermined throttle opening $\alpha$, the program proceeds from the step 107 to the step 106, wherein the compensation value $\Delta\theta$ of a crank angle is set to zero. On the other hand, if the throttle opening TH is equal to or greater than the predetermined angle $\alpha$, the program proceeds from the step 107 to a step 108. In the step 108, the compensation value $\Delta\theta$ of a crank angle is set to the predetermined compensation value $\Delta\theta_1$. After the compensation value $\Delta\theta$ of a crank angle is calculated or set in one of the steps 104, 105, 106 and 108, the program proceeds to a step 109, wherein the opening timing of the fuel injection valve 6 is calculated by the following equation:

$$\theta_s = \theta - \Delta\theta - 6 \cdot RPM \cdot 10^{-3} \cdot (\tau_i + A + B) \qquad (2)$$

where,
$\theta_s$: the opening timing of the fuel injection valve.
$\theta$[°CA]: the predetermined crank angle (for example, some angle between after top dead center 90°CA–180°CA).
RPM[R.P.M.]: the engine speed.
$\tau_i$[millisecond]: the fuel injection pulse duration.
A[millisecond]: the time period taken from the time when the fuel injection valve commences to close until the time when the fuel injection valve actually closes.
B[millisecond]: the time period taken from the time when the fuel injection valve 6 injects a fuel until the time when the injected fuel reaches to the intake valve.

After the opening timing of the fuel injection valve 6 is calculated in the step 109, the present routine ends. The opening timing $\theta_s$ of the fuel injection valve is expressed by a crank angle (°CA). This crank angle is zero at a top dead center of a piston (hereinafter referred to as TDC).

According to the above discussed flow chart shown in FIG. 3, the opening timing $\theta_s$ of the fuel injection valve is calculated. As a result, the fuel injection valve 6 opens and injects a predetermined amount of fuel.

Figure 4:
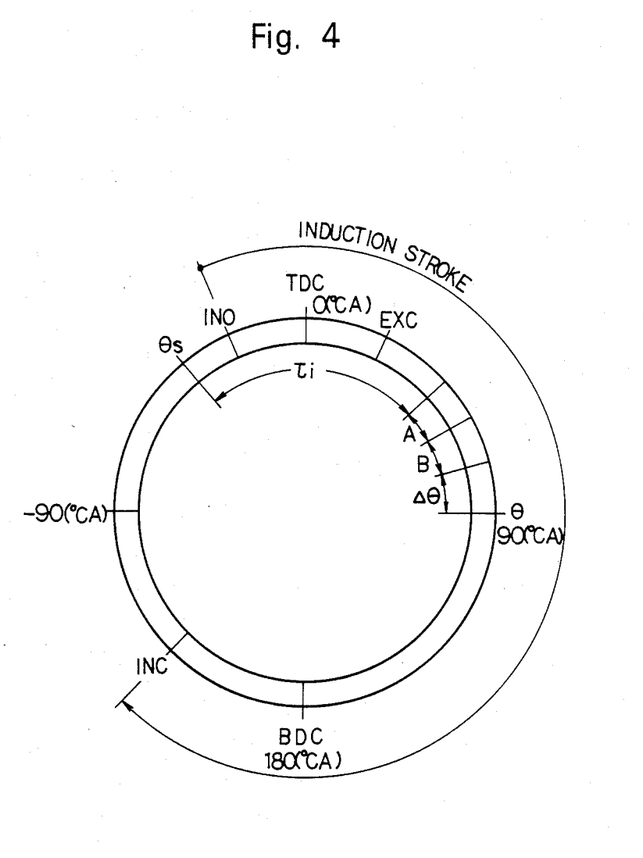
FIG. 4 is a diagram which illustrates the opening and closing timing of a fuel injection valve and an intake valve according to the present invention.

FIG. 4 shows a diagram which illustrates the opening and closing timing of the fuel injection valve 6, and the intake valve 8 according to the present invention. In FIG. 4, TDC designates the top dead center of the piston, and BDC desginates the bottom dead center of the piston. Further, the reference INO designates an opening timing of the intake valve 8 and reference INC designates a closing timing of the intake valve 8. The reference EXC designates a closing timing of the exhaust valve 5.

$\theta$ is a predetermined crank angle (°CA), as described above in the equation (2). This $\theta$ corresponds to the time period taken from the time when the final fuel is injected by the fuel injection valve 6 until the last fuel reaches the intake valve 8. The valve of $\theta$ is preferably the crank angle of 60° through 120°. According to the present embodiment shown in FIG. 4, the angle of $\theta$ is set to the angle of 90°CA after the crank angle exceeds the TDC. The reason why the amount of $\theta$ is preferably the crank angle of 60° through 120°, is that the suction speed of the mixture at the intake valve 8 becomes fastest and the intake valve 8 opens by the widest angle.

The item $6 \cdot RPM \cdot 10^{-3} \cdot (\tau_i + A + B)$ in the above equation (2) is employed in order to convert the sum of the fuel injection pulse duration $\tau_i$, and the time periods A and B into the crank angle. The opening timing of the fuel injection valve 8 is obtained by such a way as the predetermined crank angle $\theta$ is subtracted by the item $6 \cdot RPM \cdot 10^{-3} \cdot (\tau_i + A + B)$. The compensation value $\Delta\theta$ of the crank angle is obtained according to the engine conditions such as the engine coolant temperature Tc and the throttle opening TH. The opening timing $\theta_s$ of the fuel injection valve 8 is controlled according to the engine conditions and accurately controls the opening timing $\theta_s$. When the engine coolant temperature Tc is equal to or lower than the first predetermined temperature $t_1$ and the engine is not completely warmed up, the compensation value $\Delta\theta$ of the crank angle is calculated according to the engine coolant temperature Tc or the second predetermined temperature $t_2$. The opening timing $\theta_s$ of the fuel injection valve becomes earlier by the amount of $\Delta\theta$, thereby preventing the time delay of the suction of the mixture and further preventing adhesion of the fuel onto the inner surface of the intake manifold. As the time delay of the suction of the mixture is dissolved and an appropriate amount of fuel is fed into the combustion chamber of a cylinder, this enables smooth engine revolution. Further, when the engine coolant temperature Tc is equal to or higher than the third predetermined temperature $t_3$ and the throttle opening is equal to or greater than the predetermined opening $\alpha$, the compensation value $\Delta\theta$ of the crank angle is set equal to $\Delta\theta_1$. The opening timing of the fuel injection valve 8 is set to be advanced by the amount of $\Delta\theta_1$. This enables vaporization of the fuel, and lowers the temperature of the suctioned fuel. Further, after the whole amount of fuel is suctioned into the combustion chamber, the suction speed becomes fastest and the swirl of the suctioned mixture is generated within the engine combustion chamber.

According to the present embodiment, the engine coolant temperature Tc and the throttle opening TH are employed at the time when the compensation value $\Delta\theta$ of the crank angle is calculated. But, the temperature of the cylinder or piston may be employed instead of the engine coolant temperature. Further, it is possible to calculate $\Delta\theta$ according only to the engine coolant temperature Tc or the temperature of the engine cylinder and is possible to control the fuel injection when the engine is not warmed up.

While the present invention has been described in its preferred embodiments, it is to be understood that the invention is not limited thereto, and may be otherwise embodied within the scope of the following claims.

What is claimed is:

1. A fuel injection control apparatus for controlling fuel injection valves which feed fuel to each cylinder of an engine for use in a vehicle, comprising:
   a first sensing means for detecting an engine coolant temperature;
   a second sensing means for detecting a parameter which indicates a driving condition of the engine
   a first calculation means for calculating an amount of fuel to be injected into each cylinder according to an amount of the parameter detected by said second sensing means;
   a second calculation means for determining an opening timing of each fuel injection valve according to the amount of the parameter detected by said second sensing means and the amount of the fuel to be injected calculated by said first calculation means;
   a memorizing means for memorizing at least three zones of engine coolant temperatures;
   a determining means for determining which of said at least three zones said detected engine coolant temperature falls within; and
   a third calculation means for determining a compensation value, said compensation value being an amount of compensation that an opening timing of each fuel injection valve is adjusted by, according to the determining means.

2. The fuel injection control apparatus of claim 1, wherein when said determining means determines that the engine coolant temperature detected by said first sensing means is in a first zone of said at least three zones, said first zone being the lowest temperature zone, and said compensation valve is set at a first predetermined value.

3. The fuel injection control apparatus of claim 1, wherein when said determining means determines that the engine coolant temperature detected by said first sensing means is in a second zone of said at least three zones, said second zone being a temperature zone higher than said first zone, said compensation value is set at a value determined by the engine coolant temperature.

4. A fuel injection control apparatus for controlling fuel injection valves which feed fuel to each cylinder of an engine for use in a vehicle, comprising:
   a first sensing means for detecting an engine coolant temperature;
   a second sensing means for detecting a parameter which indicates a driving condition of the engine;
   a first calculation means for calculating an amount of fuel to be injected into each cylinder according to an amount of the parameter detected by said second sensing means;
   a second calculation means for determining an opening timing of each fuel injection valve according to an amount of the parameter detected by said second sensing means and the amount of fuel to be injected calculated by said first calculation means;

a memorizing means for memorizing four zones of engine coolant temperatures;

a determining means for determining which of said four zones said detected engine coolant temperature falls within;

a third calculation means for determining a compensation value, said compensation value being an amount of compensation that an opening timing of each fuel injection valve is adjusted by, according to the determining means; and a fourth calculation means for determining a compensated opening timing of each of said fuel injection valves according to the opening timing determined by said second calculation means and the compensation value determined by said third calculation means.

5. The fuel injection control apparatus of claim 4, wherein when said determining means determines that the engine coolant temperature detected by said first sensing menas is in a first zone of said four zones, said first zone being the lowest temperature zone, said compensated opening timing of each of said fuel injection valves is set at a crank angle which is advanced by a first predetermined value.

6. The fuel injection control apparatus of claim 4, wherein when said determining means determines that the engine coolant temperature detected by said first sensing means is in a second zone of said four zones, said second zone being defined between a lowest predetermined value of the engine coolant temperature and a second intermediate predetermined value of the engine coolant temperature, said intermediate predetermined value being higher than the lowest predetermined value, said compensated opening timing of each of said fuel injection valves is set at a crank angle which is advanced by an amount determined by the engine coolant temperature.

7. The fuel injection control apparatus of claim 4, wherein when said determining means determines that the engine coolant temperature detected by the first sensing means is in a third zone of said four zones, said third zone being defined between a third predetermined value of the engine coolant temperature, which is the highest predetermined value, and a second predetermined value of the engine coolant temperature which is lower than the third predetermined value, the compensated opening timing of each of fuel injection valves is not set at an advanced crank angle.

8. The fuel injection control apparatus of claim 4, wherein when said determining means determines that the engine coolant temperature detected by the first sensing means is in a fourth zone of said four zones, said fourth zone being higher than a third predetermined value of the engine coolant temperature, which is the highest predetermined value, and a throttle opening detected by the second sensing means in less than a predetermined opening, the compensated opening timing of each of said fuel injection valves is not set at an advanced crank angle.

9. The fuel injection control apparatus of claim 4, wherein when said determining means determines that the engine coolant temperature detected by the first sensing means is in a fourth zone of said four zones, said fourth zone being higher than a third predetermined value of the engine coolant temperature, which is the highest predetermined value, and a throttle opening detected by the second sensing means is greater than or equal to a predetermined opening, the compensated opening timing of each of said fuel injection valves is set at a crank angle which is advanced by a fixed value.

* * * * *